United States Patent [19]

Miyamoto et al.

[11] 3,962,524
[45] June 8, 1976

[54] GLASS FIBER-REINFORCED POLYAMIDE RESIN MOLDING MATERIAL

[75] Inventors: Akira Miyamoto; Mitsuyasu Nagano; Fumitaka Sato; Kiyoshi Morishige, all of Hiratsuka, Japan

[73] Assignee: Mitsubishi Gas Chemical Company, Inc., Tokyo, Japan

[22] Filed: Sept. 30, 1974

[21] Appl. No.: 510,860

[30] Foreign Application Priority Data
Oct. 2, 1973 Japan............................ 48-110716

[52] U.S. Cl............................ 428/435; 428/474; 428/288; 260/37 N; 260/42.18
[51] Int. Cl.² ........................................ B32B 27/34
[58] Field of Search ....... 161/227; 260/37 N, 42.18; 428/474, 435, 175, 210, 288

[56] References Cited
UNITED STATES PATENTS

| | | | |
|---|---|---|---|
| 3,700,538 | 10/1972 | Kennedy.......................... | 161/227 X |
| 3,849,374 | 11/1974 | Renner et al.................... | 161/227 X |
| 3,860,559 | 1/1975 | Minami et al.................... | 161/227 X |
| 3,920,879 | 11/1975 | Segal et al. ..................... | 428/474 |

Primary Examiner—Marion E. McCamish
Assistant Examiner—Patricia C. Ives
Attorney, Agent, or Firm—Wenderoth, Lind & Ponack

[57] ABSTRACT

A glass fiber-reinforced polyamide resin molding material, comprising a polyamide resin obtained by the condensation reaction of xylylene diamine with at least one member selected from straight-chain aliphatic $\alpha,\omega$-dicarboxylic acids having 6 to 12 carbon atoms and incorporated therein, glass fiber in an amount of 5 to 50% by weight based on the total weight of the polyamide resin and the glass fiber, and a shaped article obtained by molding aforesaid molding material.

4 Claims, No Drawings

GLASS FIBER-REINFORCED POLYAMIDE RESIN MOLDING MATERIAL

This invention relates to a glass fiber-reinforced polyamide resin molding material and to a shaped article made therefrom, and more specifically, to a molding material which comprises a polyamide resin (to be referred to hereinbelow as MX-nylon) obtained by the condensation reaction of xylylene diamine with a straightchain aliphatic $\alpha, \omega$-dicarboxylic acid and glass fiber, and to a shaped article made therefrom.

Heretofore, attempts have been made to improve the mechanical and thermal properties of shaped articles of polyamide resins such as nylon 6, nylon 66, nylon 610 or nylon 11, by incorporating glass fibers.

On the other hand, many reports have been made as to the production of MX-nylon by reacting xylylenediamine with straight-chain aliphatic $\alpha, \omega$-dicarboxylic acids such as adipic acid or sebacic acid. However, such MX-nylon has been investigated mainly as to its application to fibers to which tenacity has been imparted by stretching processes, and no study has ever been published as to its molded articles obtainable without going through stretching processes. This is because unstretched shaped articles of XM-nylon are very brittle as is clear from the fact that while unstretched shaped articles of ordinary polyamide resins such as nylon 6 or nylon 66 show ductile breakage in their stress-strain curve, unstretched articles of MX-nylon show brittle breakage in their stress-strain curve, and therefore, those skilled in the art have considered such shaped articles as far from feasible.

We have made extensive investigations as to the unstretched state of a molded article, especially an injection or extrusion molded article, of MX-nylon derived from xylylene-diamine and a straight-chain aliphatic $\alpha, \omega$-dicarboxylic acid. As a result, we found that MX-nylon obtained by the reaction of xylylene diamine (composed mainly of m-xylylene diamine) with a straight-chain aliphatic $\alpha, \omega$-dicarboxylic acid is brittle and has a low heat distortion temperature and a slow rate of crystallization, thus rendering it almost useless for making molded articles, but unexpectedly discovered that by incorporating glass fiber in the MX-nylon, the defects of this resin have been eliminated satisfactorily and from such glass fiber-reinforced MX-nylon, there can be obtained molded articles having rather superior properties to those of the conventional glass fiber-reinforced thermoplastic resins.

Accordingly, the present invention provides a glass fiber-reinforced polyamide resin molding material, comprising a polyamide resin obtained by the condensation reaction of xylylene diamine with at least one member selected from straight-chain aliphatic $\alpha, \omega$-dicarboxylic acids having 6 to 12 carbon atoms and incorporated therein, glass fiber in an amount of 5 to 50 % by weight based on the total weight of the polyamide resin and the glass fiber; and shaped articles obtained from this molding material.

The present invention will be described in detail below.

It has long been known that polyamide resins such as nylon 6 or nylon 66 exhibit excellent properties as a molding material to form not only fibers and films but also other shaped articles. However, the application of nylon 6 and nylon 66 has been drastically restricted because they have high water absorption and change in their properties upon water absorption. Furthermore, nylon 6 and nylon 66 reinforced with glass fiber show a high heat distortion temperature while being dry, but their heat distortion temperature becomes extremely lowered as a result of water absorption. MX-nylon used in this invention, without glass fiber, shows water absorption of the same tendency as nylon 6 or nylon 66, but shaped articles of this invention, with the incorporation of glass fiber nylon show very low water absorption, and high retentions of tensile strength, tensile modulus and hardness after a boiling water treatment. Thus, according to the present invention, shaped articles with good water resistance can be obtained by incorporating glass fiber into MX-nylon which has been recognized not very suitable even in the field of textile fibers because of their considerable changes in properties as a result of water absorption.

The shaped articles of this invention are superior to the known molding materials, especially in respect of rigidity and strength. In view of their heat resistance, chemical resistance, dimensional stability and thermal aging resistance, the molding material of this invention is characterized by balanced high level properties.

In view of the crystallization behavior and spherulite structure of the xylylenediamine type polyamide used in this invention, it was not thought that unstretched shaped products of this polyamide drived from xylylene diamine would exhibit such a high level of properties. Furthermore, the present invention has made it possible to provide a molding material which gives shaped articles with very high performances and balanced properties of very high level.

The xylylene diamine used to prepare the MX-nylon is m-xylylene diamine (m-xylylene-$\alpha,\alpha'$-diamine) alone or a mixture of at least 60% by weight of m-xylylene diamine and not more than 40% by weight of p-xylylene diamine (p-xylylene-$\alpha,\alpha'$-diamine). When the content of the p-xylylene diamine is larger than the above specified limit, the melting point of the resulting polymer is too high and the polymer is difficult to process by ordinary molding techniques.

The straight-chain aliphatic $\alpha, \omega$-dicarboxylic acid containing 6 to 12 carbon atoms is an aliphatic dicarboxylic acid expressed by the general formula

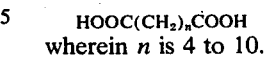

wherein $n$ is 4 to 10.

Examples of this dicarboxylic acid are adipic acid, suberic acid, sebacic acid, undecanedioic acid, and dodecanedioic acid.

In this invention, the MX-nylon derived from adipic acid as the above aliphatic dicarboxylic acid is especially preferred to obtain shaped articles having balanced properties.

Glass fibers can be added to the MX-nylon by several ways. In one example, a pelletized molding material can be produced by passing a glass fiber roving through a die when melt-extruding MX-nylon using an extruder, thereby to coat the glass fiber roving with the molten resin by a method similar to cable coating, cooling and solidifying the coated product, and then cutting it to a desired length, usually 3 to 10 mm.

In another example, a pelletized molding material can be prepared by feeding a glass fiber roving at a predetermined rate into a hopper of an extruder while cutting it to a predetermined length by means of a roving cutter provided on the hopper of the extruder, and simultaneously feeding the MX-nylon resin into the same hopper at a predetermined rate with the ratio of the glass fiber to the MX-nylon resin adjusted as desired, mixing the molten resin within the extruder to disperse the glass fiber uniformly in the resin, extruding the uniform mixture into a strand form, cooling and solidifying it and then cuttin it to a desired length.

Furthermore, it is possible to blend the resin and chopped strands of glass fiber having a length of 2 to 10 mm in the dry state at a predetermined ratio, and feeding the blend into the extruder to form a pelletized molding material.

Also, the resin pellets and chopped strands of glass fiber may be simply dry-blended at a predetermined blending ratio to make up a molding material.

The molding material of this invention so obtained can be easily formed into shaped articles by conventional methods such as extrusion, injection modling, or blow molding.

Furthermore, instead of using such a molding material as described above, the resin and glass fiber can be mixed within a molding machine such as an extruder to form shaped products directly. For example, there can be employed a method which comprises feeding a predetermined amount of glass fiber rovings into a hopper of the extruder while cutting the roving to a predetermined length by a roving cutter provided on the hopper, simultaneously feeding a predetermined amount of the resin into the hopper of the extruder, thus mixing the resin and the glass fiber intimately within the extruder, and extruding through the die of the mixture and forming directly into an article such as a pipe or sheet. The glass fiber content of the molding material or shaped articles can be reduced to the desired level by mixing the glass fiber-incorporated pellets with the MX-nylon pellets not having incorporated therein glass fiber.

The amount of the glass fiber to be incorporated is 5 to 50% by weight, preferably 10to 40% by weight, based on the total weight of the MX-nylon and the glass fiber in view of the mechanical properties, and thermal properties of the molded articles and the processability of the molding material.

When the amount of the glass fiber is less than 5%, the glass fiber do not give a sufficient reinforcing effect, and moled articles of superior properties cannot be obtained. If the amount of the glass fiber exceeds 50%, it is difficult to produce a molding material smoothly, and the equipments become worn and damaged to an increasing degree in each processes. Furthermore, a uniform dispersion of the glass fiber in the molded article is difficult to obtain, and the appearance of the molded article becomes poor.

Additives can be incorporated into the molding material or shaped articles of this invention. For example, a small quantity of a mineral powdery substance such as talc, titanum oxide or calcium carbonate for nucleating the crystallization of MX-nylon; an organic substance such as pentaerythritol, trimethylol propane or glycerol as a nucleation promotor; glass beads, glass powder or mineral fillers to improve the hardness and the dimensional stability, graphite or molybdenum disulfide to reduce the coefficient of friction, fire retardants; colorants; lubricants; antioxidants; and ultraviolet absorbers may be added to meet the purposes.

The shaped articles of this invention thus obtained have excellent mechanical properties such as tensile strength, flexural strength, compression strength, tensile modulus, flexural modulus, compression modulus, or hardness, thermal properties such as heat distortion temperature, chemical properties such as oil resistance, acid resistance or alkali resistance, and also dimensional stability expressed for example by molding shrinkage or coefficient of thermal expansion. Thus, these molded products are useful as engineering plastics.

The following Examples illustrate the present invention specifically.

EXAMPLE 1

Chopped glass fiber strands (CSO3MA411, a product of Asahi Fiberglass Company) having a length of 3 mm were added in the varying amounts indicated in Table 1 to poly(m-xylene adipamide) having a relatively viscosity, as measured on a solution of 1 g polymer in 100 ml. conc. sulfuric acid at 25°C., of 2.34, and they were mixed for 15 minutes in a V-shape blender. The blend obtained was fed into a hopper of an injection molding machine, and molded. The properties of the molded articles were measured, and the results are shown in Table 1.

Table 1

| Properties of the shaped articles | | Amount of glass fiber blended | | | |
|---|---|---|---|---|---|
| | | Not added | 10% | 20% | 30% |
| Tensile strength ($Kg/cm^2$) | After conditioning* | 899 | 1043 | 1200 | 1527 |
| | After boiling** | 690 | 707 | 992 | 1354 |
| Impact strength (Izod, notched) (Kg.cm/cm) | After moisture adjustment | 2.8 | 4.3 | 5.9 | 7.4 |
| | After boiling | 2.6 | 4.5 | 5.2 | 6.5 |
| Heat distortion temperature (°C) (fiber stress 264 psi) | After moisture adjustment | 97 | 206 | 223 | 232 |
| | After boiling | 80 | 154 | 190 | 196 |

*)The molded specimen was stored for one day in a room kept at 20°C., 65% relative humidity.
**)The molded specimen was immersed in boiling water for 5 hours and then kept for three days at room temperature in a sealed container.

The heat distortion temperature of a poly(m-xylylene adipamide) molded article was lower than 100°C., but when it was reinforced with glass fiber, its heat distortion temperature was increased by more than 100°C. Furthermore, it can be seen from the above table that the polyamide resin alone has poor impact strength, but when it is reinforced with glass fiber, its impact strength can be increased to a sufficiently feasible degree. Furthermore, the tensile strength of the molded article increases with increasing content of the glass fiber.

EXAMPLE 2

30 Parts by weight of chopped glass fiber strands was mixed with 70 parts by weight of poly(m-xylylene adipamide) having a relative viscosity, as measured in the same way as in Example 1, of 2.10, and the mixture was fed into a screw melt extruder and extruded into a strand. The strand was passed through a water bath to cool it. The cooled product was pelletized and dried.

Changes in the properties of the injection molded specimens by water absorption were determined by comparing the values obtained after boiling with those obtained in the conditioned state. The results were compared with those of poly(m-xylylene adipamide) without glass fiber, nylon 6 without and with 30% by weight of glass fiber and nylon 66 with 30% by weight of glass fiber, as shown in Table 2.

prepared from other resin such as nylon 6, nylon 66, poly(ethylene terephthalate) or poly(butylene terephthalate) and glass fiber.

A dumbell test piece for tensile strenght was prepared from each of molding materials obtained from each of the above resins and 30% by weight of dispersion-type glass fiber. The test piece was immersed for 7 days in the various liquids or solutions shown in Table 3 at 20°C., and changes in weight, appearance and tensile strength was measured. The results of measurements are shown in Table 3.

Table 3

|  |  | Nylon 6 | Nylon 66 | Present invention | Poly (ethylene terephthalate) | Poly (butylene terephthalate) |
|---|---|---|---|---|---|---|
| Control * | T | 1,185 | 718 | 1,663 | 1,038 | 1,232 |
| 10% aq. sodium hydroxide | AW | 1.53 | 1.02 | 0.37 | Δ−11.95 | Δ−0.48 |
|  | T |  1,031 | 734 | 1,656 | 0 | 95 |
|  | R | 87.0 | 102.2 | 99.6 | 0 | 7.7 |
| 28% aqueous ammonia | AW | 1.23 | 1.01 | 0.33 | 0.20 | 0.15 |
|  | T | 1,057 | 680 | 1,549 | — | 1,175 |
|  | R | 89.1 | 94.7 | 93.1 | — | 95.4 |
| 10% hydrochloric acid | AW | Δ3.96 | Δ2.06 | 0.38 | 0.11 | 0.06 |
|  | T | 687 | 578 | 1,580 | 1,016 | 1,177 |
|  | R | 57.9 | 80.5 | 95.0 | 97.9 | 95.5 |
| 10% nitric acid | AW | Δ3.96 | Δ2.79 | 0.54 | 0.15 | 0.10 |
|  | T | 742 | 557 | 1,575 | 1,014 | 1,220 |
|  | R | 62.6 | 77.6 | 94.7 | 97.7 | 99.0 |
| 30% sulfuric acid | AW | Δ □ 23.24 | Δ7.41 | 0.51 | 0.13 | 0.12 |
|  | T | 415 | 599 | 1,547 | 1,033 | 1,258 |
|  | R | 35.0 | 83.4 | 93.0 | 99.5 | 102.1 |
| Acetic acid | AW | 3.64 | 2.40 | 0.19 | 0 | 0.13 |
|  | T | 1,076 | 715 | 1,673 | 1,090 | 1,275 |
|  | R | 90.7 | 99.6 | 100.6 | 105.0 | 103.4 |
| Methanol | AW | 3.96 | 2.87 | 0.54 | 0.05 | 0.18 |
|  | T | 668 | 502 | 1,566 | 1,097 | 1,220 |
|  | R | 56.3 | 69.9 | 94.2 | 105.6 | 99.0 |

*The value of tensile strength (Kg/cm$^2$) measured after allowing the test piece to stand for 7 days in a room kept at 20°C. and 65%. RH
A: Appearance ( □ Swollen, Δ corroded; no symbol means no change), T: tensile strength (Kg/cm$^2$), W: weight increase (%), R: retention of tensile strength (%) (value based on the control value)

As can be seen from Table 3, polyesters are sensitive to alkalies, but the shaped articles of this invention scarcely undergo changes by alkalies. Furthermore, nylon 6 and nylon 66 have low resistance to acids and methanol, but the shaped articles of this invention scarcely undergo changes by acids and methanol. The tensile strength of the shaped article of this invention is more than 1,500 Kg/cm in all cases. With a 1% aqueous solution of sodium laurylsulfate, 37% formaldehyde, 10% aqueous ammonia, acetone, ethyl acetate, n-butanol, benzene, carbon tetrachloride, dioctyl phthal- Table 2

| Polyamide resin | Poly(m-xylylene adipamide) | | Nylon 6 | | Nylon 66 |
|---|---|---|---|---|---|
| Glass fiber content | None | 30% | None | 30% | 30% |
| Water absorption (%) | 3.14 | 1.97 | 5.66 | 3.80 | 2.94 |
| Retention of tensile strength (%) | 77 | 81 | 56 | 40 | 49 |
| Retention of tensile modulus (%) | 54 | 79 | 14 | 46 | 54 |
| Retention of Rockwell Hardness (%) | 93 | 97 | 80 | 86 | 87 |
| Decrease in heat distortion temperature (°C). | 17 | 15 | 11 | 28 | 27 |

EXAMPLE 3

This Example shows that the molded products of this invention obtained from the molding material prepared in Example 1 have superior chemical resistance to shaped articles obtained by similar molding materials ate, gasoline, engine oils and machine oils, the molded articles of this invention hardly change appearance, weight and tensile strength.

The shaped article of this invention thus exhibited superior balanced resistances to oils, solvents, water, acids and alkalies.

EXAMPLE 4

30 Parts by weight of chopped strands of glass fiber were blended with poly(m-xylene adipamide) having an average molecular weight, as determined by the solution viscosity method, of 14,000 and 20,000 respectively. The blend was passed through an extruder to prepare a pelletized molding material in which the glass fiber were dispersed.

The molding material obtained was dried for 4 hours at 105° to 110°C. and 30 mmHg, and injection-molded using an in-line-screw type injection molding machine (SJ-25B type, a product of Meiki Seisakusho, Nagoya, Japan). The front portion of the cylinder and the rear portion of the cylinder were maintaned at a temperature of 270°C., and 255°C., respectively. A mold to form a test piece (½ inch × ½ inch × 5 inches) for measurement of heat distortion temperature and an ASTM dumbell No. 1 test piece for measurement of tensile strength simultaneously had been mounted in the molding machine. During the molding operation, water was passed through the mold to cool it.

When the molding is effected using a low temperature mold, the cooling of a molding material that has flowed into the cavity is rapid, and therefore, that portion of the material which directly makes contact with the mold is rapidly quenched. As a result, the crystallization of the resin remains incomplete. When such a shaped article is heat-treated in an air bath, the crystallization proceeds to change the properties of the molded article. The untreated sample, and the heat-treated (170°C., 1 hour) sample were conditioned for one day at 20°C. and 65% RH. On the other hand, the heat-treated sample was further boiled for 5 hours and maintained in a sealed container for 5 days. The properties of these three kinds of samples were measured, and the results are shown in Table 4.

maintained a good balance at a high level of strength and moduli, and its deterioration by water absorption during a boiling treatment was exceptionally reduced for polyamide resins. The effect of heat-treatment was especially marked in the increase of its heat distortion temperature.

EXAMPLE 5

A mixture of 35% p-xylylene diamine and 65% m-xylylene diamine was reacted with adipic acid to form an MX-nylon salt, which was condensed to prepare a copolyamide. This copolyamide had a relative viscosity, as measured by the same method as set forth in Example 1, of 1.98.

The copolyamide was pre-dried, and fed into an extruder. Using a cross head die, it was coated on a glass fiber roving by a method similar to that used for cable coating. The material was extruded into a strand form, cooled with water, and cut to a length of 6mm to form a pelletized molding material which contained 42% by weight of the glass fiber.

The molding material was injection molded while adjusting the temperature of the mold at 150°C. The resulting test piece had a heat distortion temperature of 212°C. and an Izod impact strength (notched) of 12.2 Kg.cm/cm. When this test piece was heated for 2 hours in an air bath at 170°C., the heat distortion temperature increased to 242°C.

EXAMPLE 6

Chopped strands of glass fiber having a length of 3 mm were blended in an amount of 30% by weight 40% by weight, and 50% by weight with poly(m-xylylene adipamide) having a relative viscosity, as measured in the same way as set forth in Example 1, of 2.36, and the mixture was melt extruded and pelletized. It was found that with increasing amounts of the glass fiber, the Table 4

|  | Molecular weight of the resin | Un-treated | After heat treatment | After boiling |
|---|---|---|---|---|
| Specific gravity (g/cm$^2$) | 14,000 | 1,424 | 1,436 | 1,431 |
|  | 20,000 | 1,425 | 1,441 | 1,439 |
| Tensile strength (Kg/cm$^2$) | 14,000 | 1,690 | 1,740 | 1,360 |
|  | 20,000 | 1,790 | 1,930 | 1,480 |
| Elongation (%) | 14,000 | 1.99 | 1.76 | 1.63 |
|  | 20,000 | 2.52 | 2.01 | 1.97 |
| Tensile modulus (10$^3$Kg/cm$^2$) | 14,000 | 107 | 115 | 101 |
|  | 20,000 | 108 | 116 | 100 |
| Flexural strength (Kg/cm$^2$) | 14,000 | 2,430 | 2,280 | 2,140 |
|  | 20,000 | 2,570 | 2,660 | 2,190 |
| Flexural modulus (10$^3$Kg/cm$^2$) | 14,000 | 94.9 | 105 | 77.2 |
|  | 20,000 | 99.8 | 107 | 75.6 |
| Compressive strength (Kg/cm$^2$) | 14,000 | 2,160 | 2,490 | 2,320 |
|  | 20,000 | 2,200 | 2,500 | 2,420 |
| Compressive modulus (10$^3$Kg/cm$^2$) | 14,000 | 30.8 | 32.0 | 36.9 |
|  | 20,000 | 31.4 | 32.2 | 39.5 |
| Izod impact strength (Notched) (Kg.cm/cm) | 14,000 | 7.34 | 7.28 | 7.69 |
|  | 20,000 | 7.22 | 6.47 | 6.73 |
| Rockwell Hardness (M scale) | 14,000 | 101 | 111 | 103 |
|  | 20,000 | 99 | 110 | 101 |
| Heat distortion temperature 265 psi (°C) | 14,000 | 101 | 202 | 186 |
|  | 20,000 | 108 | 198 | 179 |

Irrespective of the molecular weight, no abnormality was observed in the injection molding and heat-treating steps. When the data shown in the above table are compared with the values described in a literature reference regarding synthetic resins (for example, Modern Plastic Encyclopedia, pages 142–164, 1972–1973), it can be seen that the shaped article of this invention screw load of the extruder and the pressure and the die portion were increased, but that when the amount of the glass fiber was up to 50% by weight, extrusion and pelletization could be smoothly performed. These three kinds of pelletized molding materials were each injection-molded. The properties of the resulting shaped articles were measured, and the results are shown in Table 5.

Table 5

|  | Amount of glass fiber (wt.%) | | |
| --- | --- | --- | --- |
|  | 30 | 40 | 50 |
| Specific gravity | 1440 | 1533 | 1645 |
| Tensile strength (Kg/cm$^2$) | 1840 | 2270 | 2650 |
| Elongation (%) | 1.83 | 1.80 | 1.95 |
| Tensile modulus (10$^3$Kg/cm$^2$) | 118 | 156 | 190 |
| Flexural strength (Kg/cm$^2$) | 2390 | 3180 | 3710 |
| Flexural modulus (10$^3$Kg/cm$^2$) | 108 | 138 | 176 |
| Compressive strength (Kg/cm$^2$) | 2450 | 2510 | 2520 |
| Compressive modulus (10$^3$Kg/cm$^2$) | 33.1 | 32.5 | 32.5 |
| Izod impact strength (Kg.cm/cm) | | | |
| Notched | 6.1 | 8.5 | 7.5 |
| Un-notched | 38.3 | 53.1 | above 79 |

When the amount of the glass fiber increased, the operability during injection molding tended to be reduced, but with amounts up to 50% by weight, the molding could be carried out in good condition. There was a tendency that the tensile, flexural and impact chatracteristics of the molded article were improved with increasing amounts of glass fiber.

EXAMPLE 7

30 Parts by weight of chopped strands of glass fiber having a length of 6 mm were mixed with 70 parts by weight of the same resin as used in Example 6, and the mixture was pelletized and injection-molded in the same way as in Example 6. The operability was the same as that of Example 6 in which the length of the glass fiber was 3 mm. The flexural strength and the impact strength of the shaped article obtained in this invention were somewhat improved over the case of the glass fiber having a length of 3 mm. The shaped article obtained in this Example had a flexural strength of 2450 Kg/cm$^2$, an Izod impact strength of 6.9 Kg.cm/cm (notched) and 41.3 Kg.cm/cm (unnotched). Other properties were not so much different from those of the shaped article obtained in Example 6.

What we claim is:

1. A glass fiber-reinforced polyamide resin molding material, consisting essentially of a polyamide resin obtained by the condensation reaction of xylylene diamine with at least one member selected from straight-chain aliphatic $\alpha,\omega$-dicarboxylic acids having 6 to 12 carbon atoms and blended therewith, glass fiber in an amount of 5 to 50% by weight based on the total weight of the polyamide resin and the glass fiber.

2. The molding material of claim 1 wherein said xylylene diamine is m-xylylene diamine or a mixture of at least 60% by weight of m-xylylene diamine and not more than 40% by weight of p-xylylene diamine.

3. The molding material of claim 1 wherein said $\alpha,\omega$-dicarboxylic acid is adipic acid.

4. The molding material of claim 1 wherein the amount of said glass fiber is 10 to 40% by weight based on the total weight of the polyamide resin and the glass fiber.

* * * * *